(12) United States Patent
Ter Beest, III

(10) Patent No.: US 10,262,437 B1
(45) Date of Patent: Apr. 16, 2019

(54) DECENTRALIZED POSITION AND NAVIGATION METHOD, DEVICE, AND SYSTEM LEVERAGING AUGMENTED REALITY, COMPUTER VISION, MACHINE LEARNING, AND DISTRIBUTED LEDGER TECHNOLOGIES

(71) Applicant: BOOZ ALLEN HAMILTON INC., McLean, VA (US)

(72) Inventor: James J. Ter Beest, III, McLean, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 16/176,673

(22) Filed: Oct. 31, 2018

(51) Int. Cl.
| | |
|---|---|
| *G06T 7/73* | (2017.01) |
| *G01C 21/00* | (2006.01) |
| *G06K 9/00* | (2006.01) |
| *G06F 15/18* | (2006.01) |
| *G06F 17/30* | (2006.01) |
| *G06N 20/00* | (2019.01) |
| *G06F 16/29* | (2019.01) |

(52) U.S. Cl.
CPC .............. *G06T 7/74* (2017.01); *G01C 21/005* (2013.01); *G06F 15/18* (2013.01); *G06F 16/29* (2019.01); *G06F 17/30241* (2013.01); *G06K 9/00671* (2013.01); *G06N 20/00* (2019.01); *G06T 2207/30244* (2013.01)

(58) Field of Classification Search
None
See application file for complete search history.

(56) References Cited

U.S. PATENT DOCUMENTS

| | | | |
|---|---|---|---|
| 9,129,181 B1* | 9/2015 | Nathan | G06K 9/3241 |
| 2014/0176720 A1* | 6/2014 | Anderson | H04N 7/181 |
| | | | 348/157 |
| 2016/0327653 A1* | 11/2016 | Humphreys | G01S 19/48 |
| 2018/0112983 A1* | 4/2018 | Ahmed | G01C 21/005 |
| 2018/0372499 A1* | 12/2018 | Ali | G01C 21/165 |

\* cited by examiner

*Primary Examiner* — Nancy Bitar
(74) *Attorney, Agent, or Firm* — Buchanan Ingersoll & Rooney PC

(57) ABSTRACT

A method for determining an exact location of an imaging device can include detecting a first object and determining its approximate location based on an approximate location of the imaging device, and determining a reliability value of the approximate location; receiving a predefined location of a second object from a memory, and determining whether the predetermined location of the second object matches, within a pre-specified margin of error, the approximate location of the first object, and when there is a mismatch greater than the pre-specified margin of error, storing the first object and its approximate location on a distributed ledger, and when there is a match within the pre-specified margin of error, determining the exact location of the imaging device based on the predefined location stored in the memory.

14 Claims, 14 Drawing Sheets

Bird's eye view of horizontal camera plane

Example wide-area image capture of New York City and Statue of Liberty

Object recognition matches computer vision library of static landmarks for positon estimation. Static object given bounding boxes. Dynamic objects discarded from reference image.

Landmarks with a high degree of confidence for positon and dimensional accuracy can support machine learning position calculation Landmarks from the representative photo that exist in the database which hold 3D data to allow the machine learning algorithm to estimate the user device position.

US 10,262,437 B1

DECENTRALIZED POSITION AND NAVIGATION METHOD, DEVICE, AND SYSTEM LEVERAGING AUGMENTED REALITY, COMPUTER VISION, MACHINE LEARNING, AND DISTRIBUTED LEDGER TECHNOLOGIES

FIELD

The present disclosure generally relates to methods, devices, and systems for calculating position and navigation among physical landmarks and stationary objects through the use of machine learning.

BACKGROUND INFORMATION

Known devices leverage Global Navigation Satellite Systems (GNSS) such as the United States' Global Positioning System (GPS) and terrestrial navigational aids such as Assisted-GPS (A-GPS) and Wi-Fi Positioning Systems to provide position and navigation determination. A-GPS and Wi-Fi Positioning supports metropolitan-area position determination by listening for nearby static signals such as Commercial Cellular or IEEE 802.11 (Wi-Fi) to either triangulate whereabouts to a rough approximation or determine nearby proximity to a low power signal via metadata database search.

When approximate coordinates are determined, a hot-start GNSS fix can be obtained to determine a more exact absolute geographic coordinate position. GNSS measurements, however, are not accurate enough to provide precision measurements for certain applications, especially for applications reliant on accurate altitude information. A GNSS receiver's real-time received signals from orbiting satellites may also be victim to data integrity or disruption as a result of natural or manmade phenomena which could impede use at certain times or positions.

Augmented Reality (AR) is an interactive experience of a real-world environment whereby the objects that reside in the real-world are "augmented" by computer-generated perceptual information, sometimes across multiple sensory modalities, including visual, auditory, haptic, somatosensory, and olfactory. The overlaid sensory information can be constructive (i.e. additive to the natural environment) or destructive (i.e. masking of the natural environment) and is seamlessly interwoven with the physical world such that it is perceived as an immersive aspect of the real environment. In this way, augmented reality alters one's ongoing perception of a real-world environment.

Existing AR technologies do not fully leverage absolute coordinate systems. Virtually all AR goggles operate with relative coordinate systems rather than absolute coordinate systems. This capability is fairly limiting when using AR goggles for future applications operating in broad, contiguous, geographic footprints.

The present disclosure describes methods, devices, and systems to overcome the above limitations in the existing AR technologies.

SUMMARY

A method of determining an exact location of an imaging device is disclosed. The method can include detecting a first object and determining its approximate location based on an approximate location of the imaging device; determining a reliability value of the approximate location based on at least one of a credential of the imaging device, a topology of a surface that is associated with the first object, or proximity between the imaging device and the first object; receiving a predefined location of a second object from a memory; and determining whether the predetermined location of the second object matches, within a pre-specified margin of error, the approximate location of the first object, wherein when there is a mismatch greater than the pre-specified margin of error, storing the first object and its approximate location on a distributed ledger, and when there is a match within the pre-specified margin of error, determining the exact location of the imaging device based on the predefined location stored in the memory.

An imaging device that can determine its exact location is disclosed. The imaging device includes an optical sensor configured to detect a first object; a memory configured to store a predefined location of a second object; and a processor including: an approximate location module configured to determine an approximate location of the first object, a reliability value module configured to determine a reliability value of the approximate location based on at least one of a credential of the imaging device, a topology of a surface that is associated with the first object, or proximity between the imaging device and the first object, and a matching module configured to determine whether the predefined location of the second object matches the approximate location of the first object within a pre-specified margin of error, wherein when there is a mismatch greater than the pre-specified margin of error, the processor is configured to store the first object and its approximate location on a distributed ledger, and when there is a match within the pre-specified margin of error, the processor is configured to determine the exact location of the imaging device based on the predefined location stored in the memory.

A system for determining an exact location of an imaging device is disclosed. The system includes an imaging device configured to detect a first object, and determine an approximate location of the first object, and a reliability value of the approximate location based on at least one of a credential of the imaging device, a topology of a surface that is associated with the first object, or proximity between the imaging device and the first object; a memory configured to store a predefined location of a second object, wherein the imaging device is configured to determine whether the predetermined location of the second object matches the approximate location of the first object within a pre-specified margin of error; and a distributed ledger that stores the first object and its approximate location when there is a mismatch greater than the pre-specified margin of error, wherein when there is a match within the pre-specified margin of error, the imaging device determines its exact location based on the predefined location stored in the memory.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

An exemplary aspect of the present disclosure describes an Augmented Reality Global Positioning System (ARGPS) that can provide resilient terrestrial navigation for commercial mobile devices and embedded technologies. Each independent sensor of the disclosed ARGPS can use a variety of advanced search and measurement techniques to recognize and navigate itself among a global database of physical landmarks.

The disclosed ARGPS can integrate several impactful, emerging technologies together including real-time position, navigation, and timing (PNT) techniques, Computer Vision (CV), Machine Learning (ML), Augmented Reality (AR), and distributed ledger blockchain-based services. The disclosed ARGPS can include a software-based solution residing on smartphones or embedded hardware platforms that leverage sensors, CPUs, GPUs, and network services that support the aforementioned emerging technologies.

Hardware associated with the disclosed ARGPS can include but is not limited to a compilation of components included in recent model Apple, Google, Sony, and Samsung mobile devices. These hardware platforms can be equipped with a combination of technologies integrated to support Augmented Reality (AR) such as Apple's ARKit and Google (Android) ARCore.

Through each of these technologies, the disclosed ARGPS method, system, and device can identify real-world fixed terrestrial objects from a user device camera, assess respective positions (topologies), query a database for those objects, determine an exact device position with respect to the arrangement of the object positions, and continue to calculate its own absolute position using its AR platform. The next few paragraphs highlight the overall ARGPS solution and provide detailed specifics about the role each supporting technology provides to ARGPS.

Figure 1:
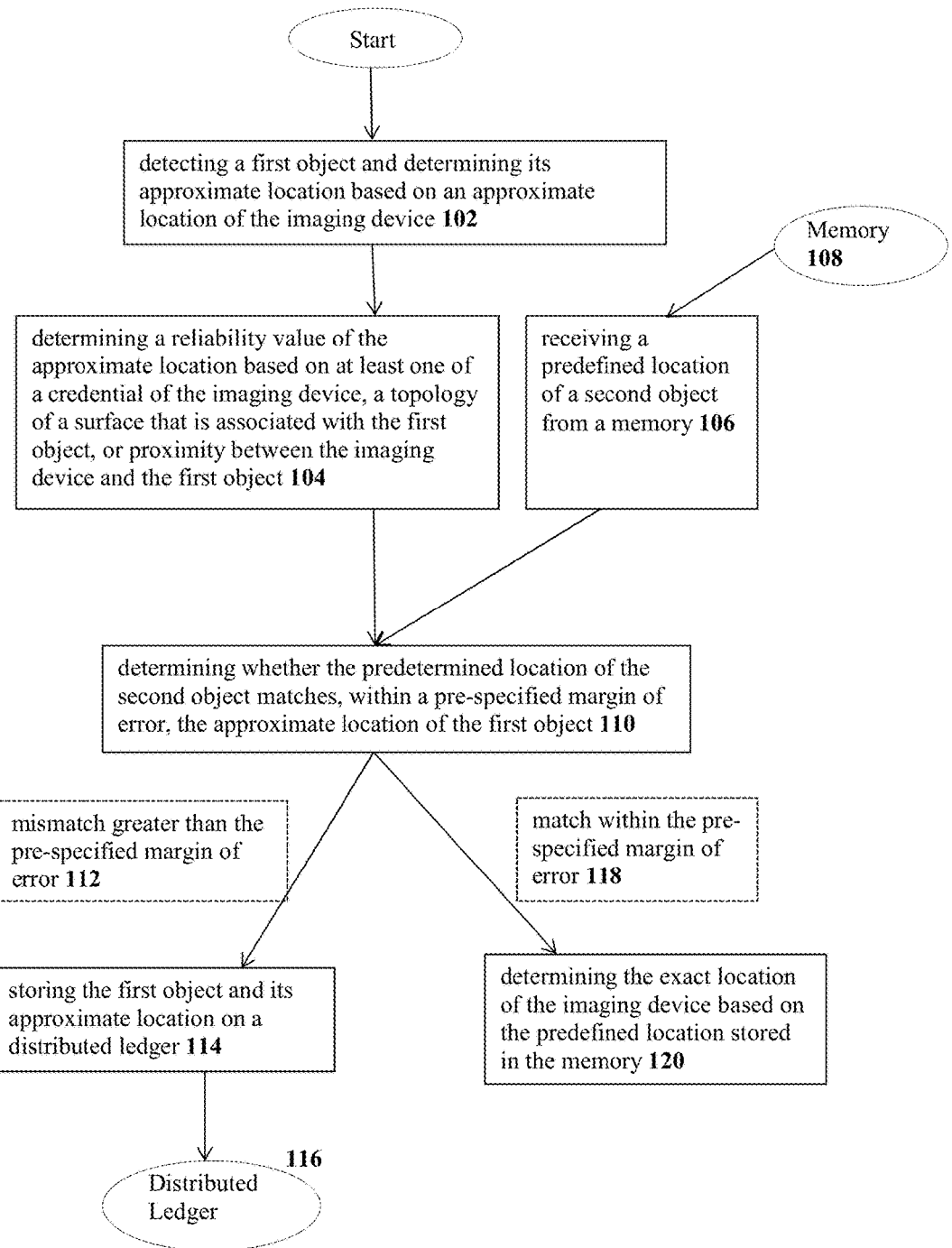
FIG. 1 is an exemplary flowchart depicting a process for determining an exact location of an imaging device.

FIG. 1 illustrates an aspect of the present disclosure related to an ARGPS method 100 of determining an exact location of an imaging device. The exact location of the imaging device can be an exact global position of the imaging device, which includes global absolute coordinate position (i.e. latitude, longitude, and elevation) and spatial position of the imaging device. The spatial position can include change of heading along horizon, i.e., yaw or right ascension, spin around the horizon, i.e., roll, and spin around the Traverse Axis, i.e. pitch, or azimuth.

The method can include detecting a first object, and determining its approximate location based on an approximate location of the imaging device 102. The method can include using computer vision (CV) platforms/frameworks/process to detect one or more stationary objects as the first object. The stationary objects can have rigid physical structural properties, and geographic positions that can be referenced to a specific planetary surface position for a time period supporting reasonable guarantees that the object has not moved or changed shape.

In an exemplary embodiment, if the first object does not fit a profile of stationary objects, the method can include ignoring the first object. If the first object fits a profile of stationary objects, the method can include the first object. Stationary objects can be classified based on a likelihood of being stationary for long periods of time. For instance, a building foundation may be stationary for decades where its exterior décor (e.g., a storefront sign) may only be stationary for a few months.

In an exemplary embodiment, examples of stationary objects may include, but are not limited to, terrestrial outcrops, curbs, signs, fire hydrants, skylines, survey markers, historical sites, astronomical objects, building foundations, and statues. Morphological objects such as living organisms, ground/sea/airborne vehicles, and other objects prone to frequent movement may be discarded for lack of importance to position and navigation measurement.

A computer vision (CV) process can be used to identify and classify stationary objects within the camera field of view of the imaging device, allowing for custom machine learning-based database searches to determine the imaging device's exact position. The specific topology of objects as reported by the CV process can allow a machine learning routine to further process the database results for the exact end user position where all objects were identified.

In an exemplary embodiment, CV algorithms and image repositories can be leveraged to detect and classify common stationary objects. CV algorithms can incorporate Edge, Corner, Blob, and Ridge Detection, Hough Transforms, Gradient Histograms, Feature Transforms, and Optical Character Recognition. A custom runtime application can selectively use these algorithms to populate a grouping of stationary objects in the computer's memory that is obtained from the device camera image (video) capture. In an exemplary embodiment, the runtime application leveraging various CV algorithms can selectively discard morphological objects that may initially be present from commercial image repositories (e.g. living organisms, vehicles, etc.).

The method can include determining a reliability value of the approximate location based on at least one of a credential of the imaging device, a topology of a surface that is associated with the first object, or proximity between the imaging device and the first object 104. The credential of the imaging device can be based on, but is not limited to, one or more of a reputation of a user operating the imaging device, a capability of the imaging device, and accuracy of the imaging device.

In an exemplary embodiment, the reputation of a user can be based on their past record of providing accurate information. Reputation of the user can be determined by a rating provided by other users to build trust through reputation. A reputation of the user can provide a significant trend in decision support to the users to be confident in the outcome of the exchange through trust built by recommender systems. The reputation of the user can be determined from the feedback received from other users. In an exemplary embodiment, similarities between various user feedbacks can be used to determine the reliability value.

The method can include receiving 106 a predefined location of a second object from a memory 108; and determining whether the predetermined location of the second object matches, within a pre-specified margin of error, the approximate location of the first object 110. If there is a mismatch greater than the pre-specified margin of error 110, storing 114 the first object and its approximate location on a distributed ledger 116, and if there is a match within the pre-specified margin of error 118, determining the exact location of the imaging device based on the predefined location stored in the memory 120.

The first object and its approximate location that is stored on the distributed ledger 116 meets a prequalified status where the CV application determines that the first object is a likely candidate for entry into the distributed ledger when the percent confidence of the respective object detection is above the threshold for qualification.

In an exemplary embodiment, ARGPS infrastructure can have "genesis objects" in the database which are generated from existing building topology datasets or similar datasets that maintain civil engineering objects such as roads or other public infrastructure. The objects can be categorized as being genesis objects and will be able to easily edit with devices capable of adding measurement granularity, but available for initial navigation attempts.

Existing objects within the distributed ledger 116 may be deemed worthy of improved measurements from higher accuracy instrumentation or sensors having closer proximity or better perspectives to the objects of interest. In this process, the imaging device locally notices discernable differences from what the distributed ledger 116 provides. The distributed ledger 116 may also provide existing indication of reduced accuracy to the end user device by way of age (including genesis block categorization), low polygon count, low number of prior adjudications, or prior measurement from a device or user with a low-ranking proof-of-reputation. With lower measurement accuracy, the imaging device can submit nominations of object editing to the distributed ledger 116 if accuracy is over a certain system-defined threshold and if the imaging device permits such transmission.

In an exemplary embodiment, a critical mass of recorded static objects can be required to support a global positioning and navigation capability. As a result, the envisioned repository of objects leverages secure data storage, distribution infrastructure, a search process, object entry, adjudication of new or existing objects, the object and contributor ranking algorithm, and the use of additional secondary ledgers and/or databases.

The method can include determining the approximate location of the imaging device using at least one of Global Navigation Satellite System (GNSS), GNSS receivers, Differential GPS, E-LORAN, Assistive-Global Positioning System (A-GPS), A-GPS receivers, accelerometers, gyroscopes, magnetometers, compasses, barometers, radio frequency, LiDAR, or laser measurement sensors (infrarometers).

The approximate location of the imaging device can be derived from approximate absolute coordinates and spatial orientation of the device. The imaging device can be a smartphone or can include other precision scientific and industrial position and navigation equipment that can calculate real-time position information (absolute coordinates) using onboard sensors including GNSS (e.g., GPS), Assistive-GPS (A-GPS), Differential GPS, E-LORAN, accelerometers, gyroscopes, magnetometers, compasses, barometers, RF (e.g. FM or DVB-T Radio), LiDAR, and laser measurement sensors.

The real-time position information can be used to calculate approximate latitude, longitude, altitude, and camera (imaging device) spatial position (pitch, roll, raw and respective camera pan, tilt, and zoom). This allows obtaining an approximate absolute position and spatial orientation of the imaging device which narrows the search activities described in the latter steps of this process. The position determination may be as approximate as a digital pointer on a map or rough estimate of about WGS 84 degrees (latitude and longitude).

GNSS systems can provide positioning, navigation, and timing (PNT) services on a global or regional basis. The GNSS system can be, but is not limited to, any one of the United States' Global Positioning System (GPS), Russia's GLONASS, China's BeiDou Navigation Satellite System (BDS), the European Union's Galileo, or the GNSS's developed by India, France and Japan for developing regional navigation and augmentation systems.

An Assisted GPS or Augmented GPS (A-GPS) can improve a startup performance i.e., time-to-first-fix (TTFF) of a GPS satellite-based positioning system. A-GPS can be used with GPS-capable cellular phones. LiDAR can be used as a surveying method to measure a distance to a target by illuminating the target with pulsed laser light and measuring the reflected pulses with a sensor.

The method can include determining the approximate location of the first object by using the approximate location of the imaging device, and by estimating a distance between the first object and the imaging device. The accuracy of the approximate location of the first object can be improved upon by using a consensus (crowd input) process.

The consensus process can involve multiple users that are able to directly witness the multiple models of the same object to be selected to vote on the more accurate model. The multiple users and the user of the imaging device can directly assess the accuracy of the computer vision algorithms (e.g. Edge, Corner, Blob, and Ridge Detection, Hough Transforms, Gradient Histograms, Feature Transforms, and Optical Character Recognition).

The votes are weighted by ranking the combined user's earned trust (proof-of-reputation) and the imaging device's accuracy (also proof-of-reputation). The imaging device can be provided with a baseline proof-of-reputation based on its global capability in providing a certain level of accuracy, then adjusted for specific user-owned behavior. The new object input provided by the consensus process can replace or merge with the old approximate location, or be discarded.

In an exemplary embodiment, the consensus process can involve private or layered database forks. For instance, a construction user community may wish to identify various structural components of a building as it is being built for precision measurement of added layers in short duration time frames. Military users may wish to identify custom markers for operationally sensitive purposes. In these instantiations, the user communities of these groups may look at the public data set, the private, or both.

The method can include searching in a database of known objects for the second object and its predefined location, and storing the second object and its predefined location in the memory. The database of known objects can included informnation (e.g. positional information) related to objects that are well known (e.g. Statue of Liberty) and/or have been previously identified.

The method can include identifying the second object in the database of known objects by matching traits of the first object with the known objects, wherein the traits include at least one of a topology of an associated surface, recognizable features, or a location. The recognizable features can include one or more of text, marks, or edge information. These recognizable features can provide unique position information in 3D space, which can allow the native augmented reality and the ARGPS method to calculate the imaging device's exact real-time, absolute, spatial position and altitude.

The database of known objects can be organized by many techniques. In an exemplary technique, the database of known objects can categorize all objects by absolute coordinates and altitude. In another exemplary technique, the database can categorize the type of each object as defined by a custom CV model curated to ensure a concise set of classifications are maintained. For example, "street sign" may be a proper classification where "stop sign" or "yield sign" may not. This strict adherence will manage performance of the system over time based on the total density of objects.

The method can include determining an extent of the searching in the database of known objects based on at least one of a precision of the approximate location of the imaging device, or a geographic area observed by the imaging device.

Searching can be performed by assessing an immediate field of view and the total distance considered from the imaging device's origin. The specific field of view can be determined by knowledge of the horizontal and vertical ratio of image surface area and its representative image defined by the lens angle. The field of view can then be extruded three dimensionally through the axis of the camera (in a pyramid shape) based on the determined distance of camera view. The extruded 3D geometry is then considered the search boundary for identified objects. The beginning point of the boundary can be the center point of the camera lens. The end point of the boundary can be an arbitrary distance as determined by the software. For instance, a device operating indoors may select the search distance to be several feet if the camera is pointed towards the ground or several hundred feet if the camera is pointed towards the horizon. In an outdoor environment that horizon distance could be several hundred miles (e.g. terrestrial profile).

Absolute coordinate system used in the searching process can be in an Earth-Centered-Earth-Fixed (ECEF) decimal format and unlimited in the chosen number of significant figures (with respect to device level of accuracy) so as not to eliminate the possibility for operations in miniature environments or limit advanced systems from achieving designed level of precision measurements. Upon completion of the search, the discovered information can be assessed by a machine learning process to predict real time position from all external visual inputs. The machine learning process can weigh a likelihood of object accuracy, an object's proximity to the user device, and a number of visual sources to estimate an accurate position.

In an exemplary embodiment with a heterogeneous user device environment, different sensing capabilities and levels of precision can exist. In that sense, an adaptive level of precision for each object can be in place so that devices may report new objects at low polygon resolution without having to meet a specific requirement. In that sense, objects entered in the database may be initially defined within a three-dimensional box where the object is calculated to exist within those parameters and the center point of that box volume is the defined center point. From that basic measure, objects may hold more accuracy in the form of detected boundaries, faces, edges, and vertices points which ultimately form a 3D object, such as an STL or OBJ. Objects can also be recorded with other CV properties such as color data to verify/validate the CV detection.

The method can include determining the topology of the surface associated with the first object based on at least one of a location of the imaging device, orientation of the imaging device, terrain of the first object's surface, proximity of the first object to the imaging device, curvature of the earth, or an optical property of the imaging device.

The terrain can be expressed in terms of the elevation, slope, and orientation of the first object's surface. The optical property can depend on materials used for constructing lens elements of the imaging device. The optical properties can include, but are not limited to, one or more of the refraction and the lens material's refraction index, polarization, reflection and the material's albedo or reflectance, absorption, photoluminescence (fluorescence), transmittance, diffraction, dispersion, dichroism, scattering, birefringence, color, or photosensitivity.

The method can include determining the credential of the imaging device based on at least one of a reputation of a user operating the imaging device, a capability of the imaging device, and accuracy of the imaging device. In an exemplary embodiment, the reputation of a user can be based on their past record of providing accurate information as discussed previously in this disclosure. In an exemplary embodiment, the capability and accuracy of the imaging device can depend on, but is not limited to, many factors such as aperture size, number of pixels, lens & pixel size, image stabilization technology within the camera.

The method can include identifying the first object as a stationary object when the first object has a rigid structural property and a geographic position that can be referenced to a specific planetary surface global position for a particular duration, and ranking the first object based on at least one of the reliability value of the approximate location, or the particular duration. The first object is ranked based on the likelihood of being stationary for long periods of time. For instance, a building foundation may be stationary for decades where its exterior décor (e.g., a storefront sign) may only be static for a few months. Objects with a higher longevity ranking may be used to adjudicate a device's true position during granular position calculations.

The method can include storing the first object and its approximate location on the distributed ledger when the first object is ranked above a predefined rank, and/or when the first object has a prequalified status, and/or when the first object and its location have been adjudicated by a number of users greater than a predefined value.

The method can include identifying types of stationary objects in a field of view of the imaging device using real-time object detection, and determining a relative birds-eye topology of each of the stationary objects based on the spatial orientation and an absolute position of the imaging device. The birds-eye topology can be an elevated view of an object from above, with a perspective as though the observer were a bird. The birds-eye topology can be an aerial photograph or a drawing.

In an exemplary embodiment, on detection of all stationary objects from an image capture, the application can create bounding boxes around each distinct object, as shown in FIGS. 2A, 2B, 2C, and 2D. The application can then attempt to estimate the absolute coordinates of the detected object's center point(s) with respect to the current estimated sensor position. Upon estimation of all stationary object center points, an approximate bird's eye topology can be created to allow the machine learning algorithm to search for the same position pattern of objects throughout the device environment.

Figure 2A:
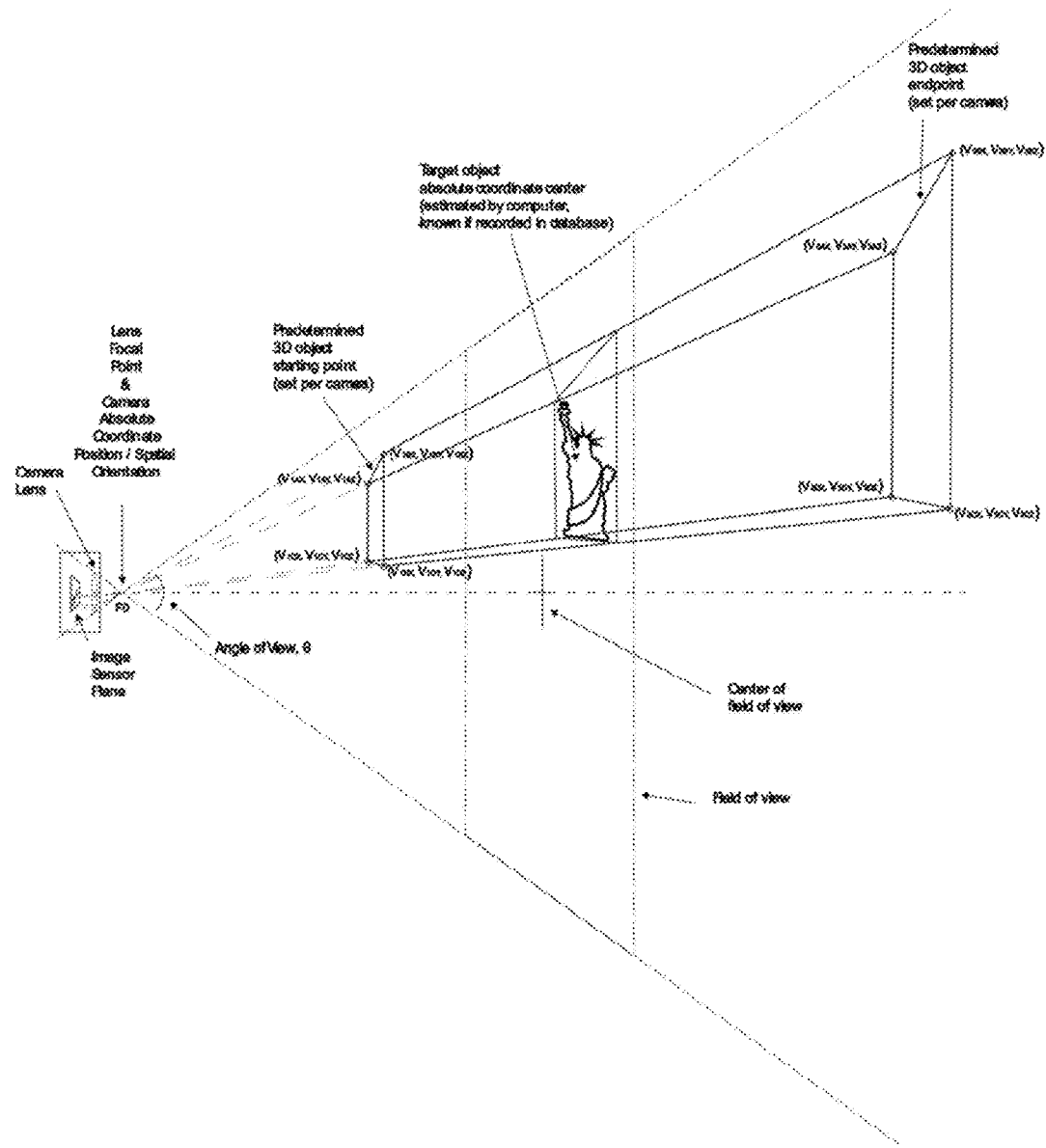
FIGS. 2A, 2B, 2C, and 2D are exemplary diagrams depicting of how absolute coordinates and spatial position of a computer vision camera can be used to determine where the recognized objects are in the field of view for a follow-on machine learning activity.

FIG. 2A shows an imaging device 202 with an associated camera lens 204 and an image sensor plane 206. A field of view 208 of the imaging device 202 can be a function of the angle of view 210. In an exemplary embodiment, the field of view 208 can capture a target object 212 that can be defined by its x, y, and z coordinates. The target object 212 can have a predetermined starting point 214, and a predetermined end point 216, which can be set based on the imaging device 202.

Figure 2B:
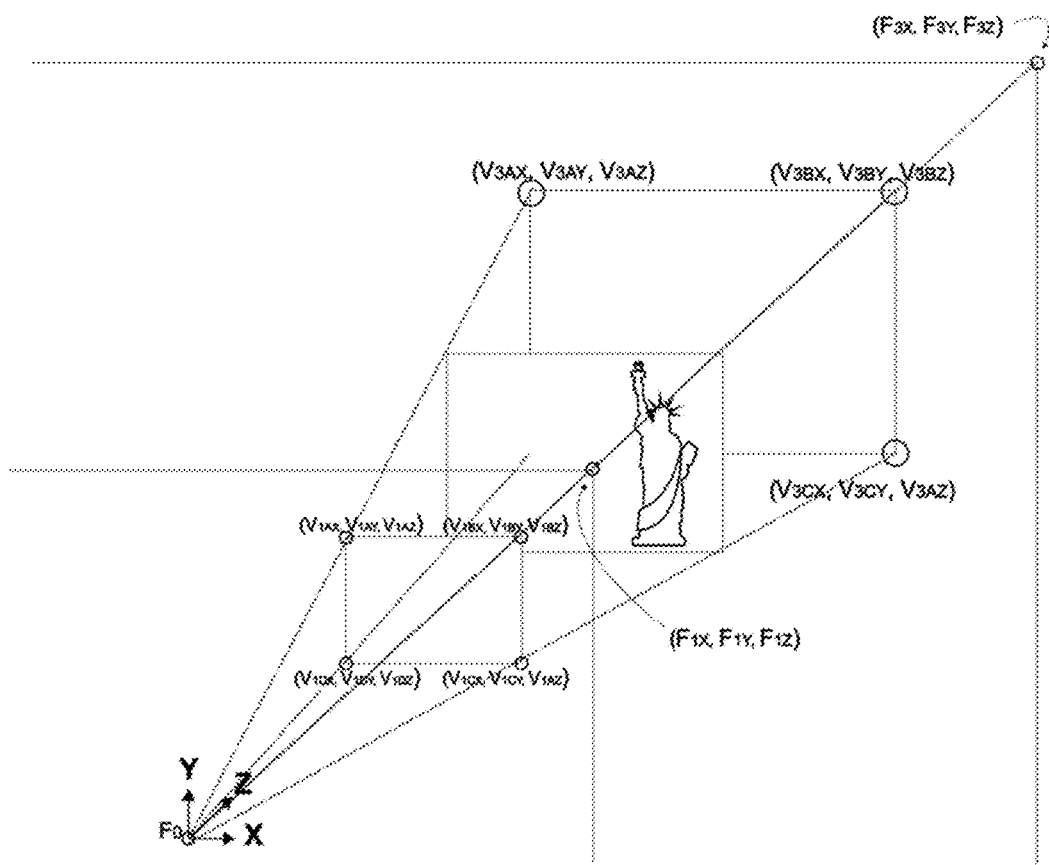

FIG. 2B shows an isometric view of target object 212 that can be encompassed by two sets of vertices ($V_{1i}$ and $V_{3i}$), which form surrounding polygons in two planes ($F_{1i}$ and $F_{3i}$). For example, vertex [($V_{1ax}$, $V_{1ay}$, $V_{1az}$), ($V_{1bx}$, $V_{1by}$, $V_{1bz}$), ($V_{1cx}$, $V_{1cy}$, $V_{1cz}$), ($V_{1dx}$, $V_{1dy}$, $V_{1dz}$)] and [($V_{3ax}$, $V_{3ay}$, $V_{3az}$), ($V_{3bx}$, $V_{3by}$, $V_{3bz}$), ($V_{3cx}$, $V_{3cy}$, $V_{3cz}$), ($V_{3dx}$, $V_{3dy}$, $V_{3dz}$)] can be the two sets of vertices forming the surrounding polygons in the focal planes [($F_{1x}$, $F_{1y}$, $F_{1z}$), ($F_{1x}$, $F_{1y}$, $F_{1z}$)].

Figure 2C:
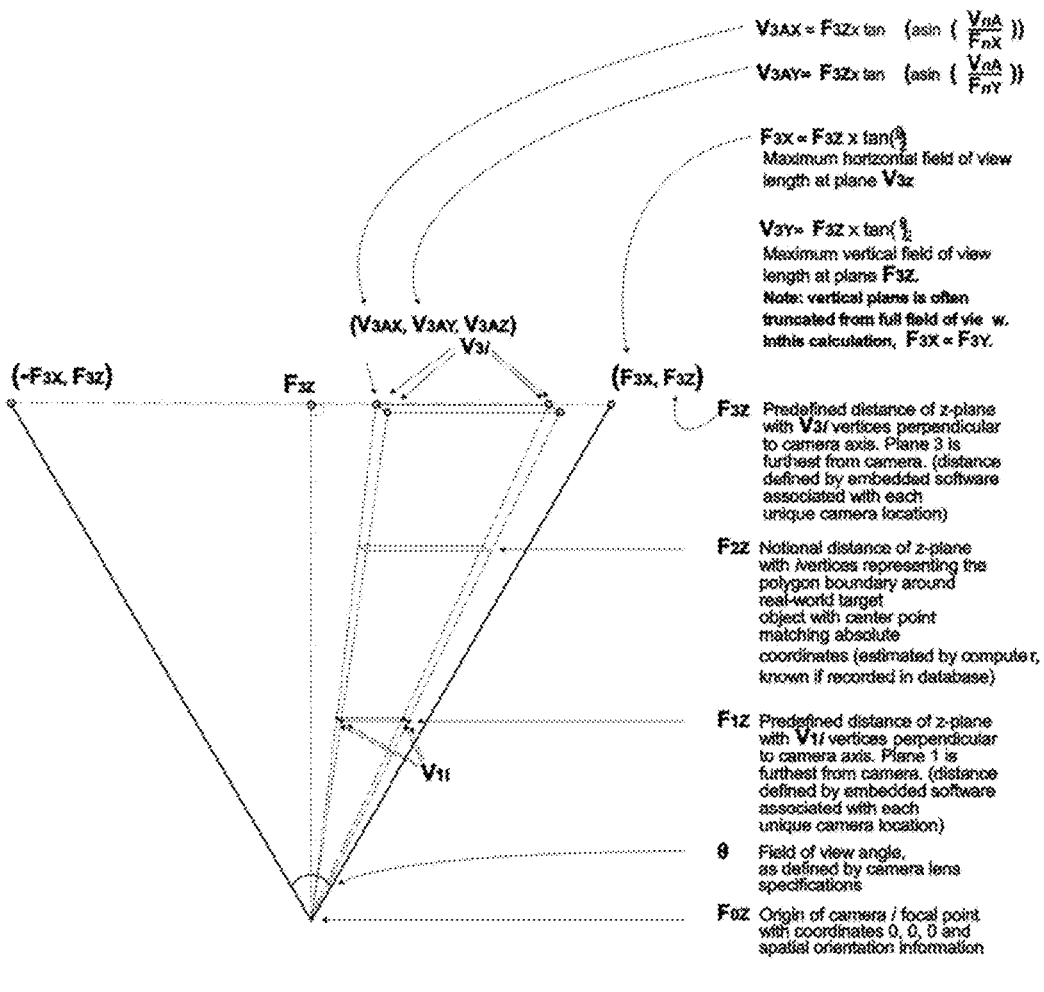

FIG. 2C shows a bird's eye view of a horizontal camera plane of a camera. In this view, the focal point/origin of camera $F_{oz}$ can be represented by spatial coordinates (0,0,0) and the field of view angle as defined by the camera lens specifications is represented by Ø. $F_{1z}$ is a predefined distance of z-plane with $V_{1i}$ vertices perpendicular to an axis of the camera. $F_{2z}$ is a notional distance of z-plane with vertices representing the polygon boundary around a target object with center point matching absolute coordinates. $F_{3z}$ is a predefined distance of z-plane with $V_{3i}$ vertices perpendicular to an axis of the camera. In an exemplary embodiment, the vertices can be a function of a distance of a z-plane. For example, $V_{3ax}=F_{3zx}$ tan (a sin($V_{nd}/F_{nx}$)), or $V_{3ay}=F_{3zx}$ tan (a sin($V_{nd}/F_{ny}$)). In an exemplary embodiment, the maximum horizontal field of view length can be a function of a distance of a z-plane. For example, $F_{3x}=F_{3z} \times$tan (Ø/2). In an exemplary embodiment, the maximum vertical field of view length can be a function of a distance of a z-plane. For example, $V_{3y}=F_{3z} \times$tan (Ø/2). In an exemplary embodiment where a vertical plane is truncated from full field of view, $F_{3x}$ can be equal to $F_{3y}$.

Figure 2D:
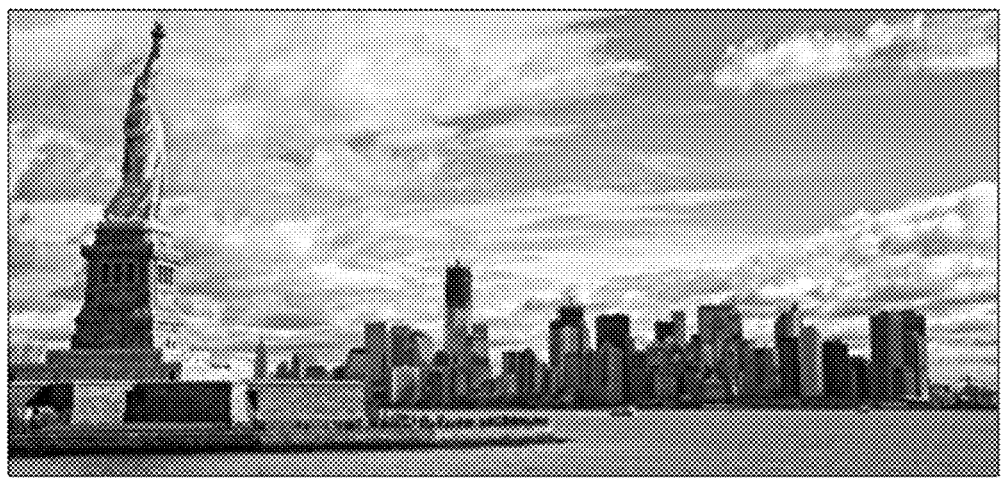
Figure 2D:
Figure 2D:
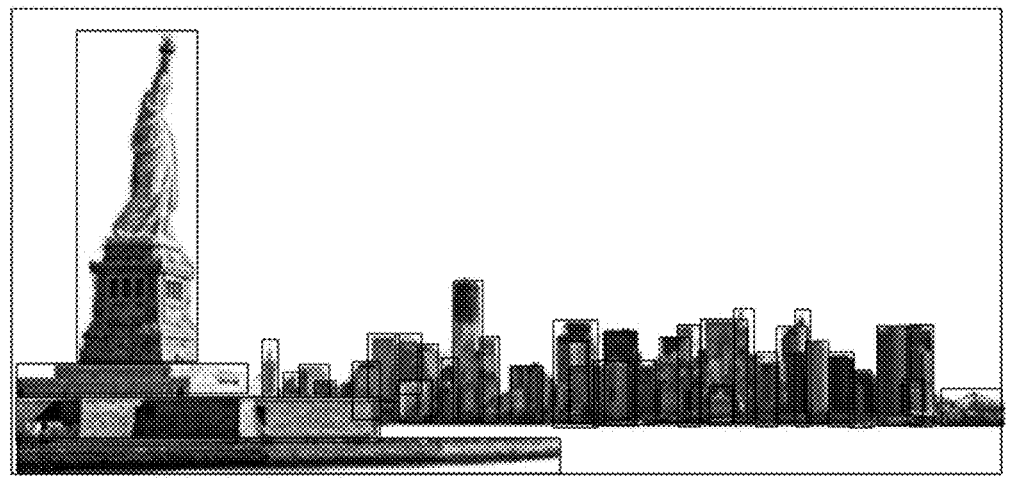

FIG. 2D shows a wide-area image capture of New York City and Statue Of Liberty. In an exemplary embodiment, object recognition can match computer vision library of static landmarks for position estimation. Static objects can be given bounding boxes and dynamic objects can be discarded from the reference image.

Figure 3:
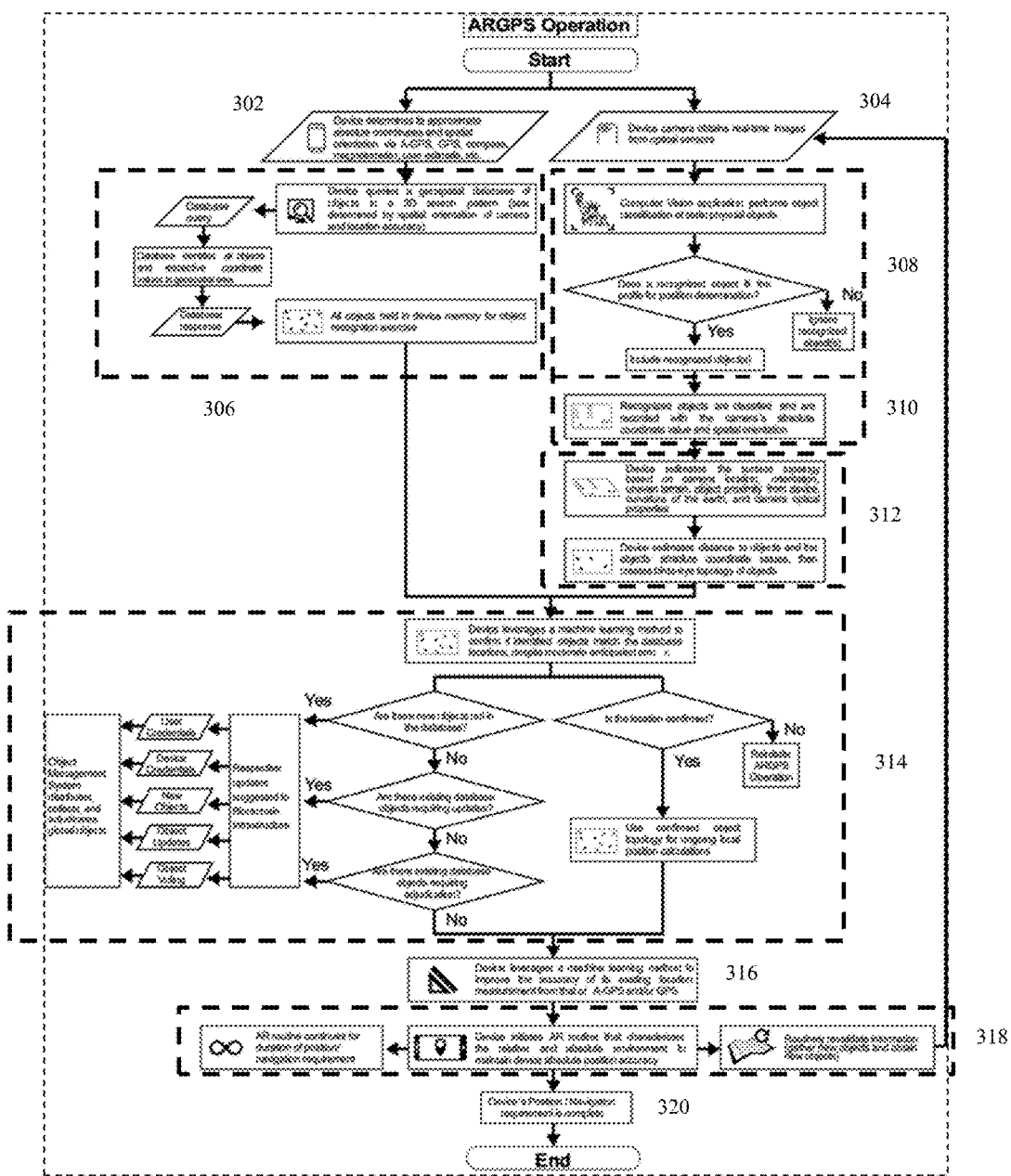
FIG. 3 shows an exemplary detailed process for an augmented reality global positioning system (ARGPS)

FIG. 3 illustrates an exemplary detailed process for an augmented reality global positioning system (ARGPS). In an exemplary embodiment, the process can be a detailed form of the flowchart of FIG. 1 that illustrates determining an exact location of an imaging device. The process can operate on an imaging device which can pull data from its sensors, external signals of interest (GNSS, Wi-Fi, cellular), and blockchain-managed database of users, devices, and objects.

The process of FIG. 3 can include a step 302 of determining the approximate location of the imaging device and a step 304 of obtaining real-time images from optical sensors. In an exemplary embodiment, the step 302 can include using at least one of Global Navigation Satellite System (GNSS), Assistive-Global Positioning System (A-GPS), accelerometers, gyroscopes, magnetometers, compasses, barometers, radio frequency, Lidar, or laser measurement sensors, or any equivalents thereof.

The process of FIG. 3 can include a step 306 of querying a geospatial database of objects in a 3D search pattern such that the database can identify all objects and respective coordinate values in a geospatial area. The identified objects can be stored in a memory for object recognition.

The process of FIG. 3 can include a step 308 of performing classification of stationary physical objects using a computer vision application (e.g. Edge, Corner, Blob, and Ridge Detection, Hough Transforms, Gradient Histograms, Feature Transforms, and Optical Character Recognition, or equivalents thereof) to assess whether an object fits a profile for position determination. Objects can be classified and recorded with the imaging device's absolute coordinate value and spatial orientation, as shown in step 310. The imaging device can estimate surface topology based on its approximate location, orientation, terrain, curvature of the earth, proximity of an object from the imaging device, and optical properties of the imaging device.

The process of FIG. 3 can include a step 312 of estimating distance to objects from the device and estimating objects' absolute coordinate values to create a birds-eye topology of objects. The birds-eye topology can be an elevated view of an object from above, with a perspective as though the observer were a bird. The birds-eye topology can be an aerial photograph or a drawing.

The process of FIG. 3 can include a step 314 of determining if identified objects match the database locations, within a pre-specified margin of error. In an exemplary embodiment, the step 314 can include confirming location of objects, determining whether objects are already recorded in a database, or determining whether to perform existing database objects updates.

In an exemplary embodiment, step 314 can include providing updates suggested to Blockchain infrastructure, which includes updates based on one or more of user credentials, device credentials, new objects, object updates, and object voting, or any equivalents thereof. An object management system that can distribute, collect, and/or adjudicate objects, and that can interface with the Blockchain infrastructure is modified accordingly.

The process of FIG. 3 can include a step 316 that can improve accuracy of existing location measurement of the device using a machine learning method, a step 318 to initiate an routine that can characterize the relate and absolute environment to maintain device position accuracy that continues until a device's position/navigation requirement is complete 320.

The methods in the present disclosure can be implemented by a processor with an associated memory, or any equivalents thereof. The term "processor" as used herein may include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), Graphics Processor Units (GPUs), Field Programmable Gate Arrays (FPGAs) and Application-Specific Integrated Circuits (ASICs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

The term "memory" as used herein can be volatile (such as RAM), non-volatile (such as ROM, flash memory, etc.) or some combination of the two. The computer memory includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information, and which can be accessed by the device.

Various forms of computer-readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor retrieves and executes the instructions. The instructions received by main memory may optionally be stored on storage device either before or after execution by a processor.

Figure 4:
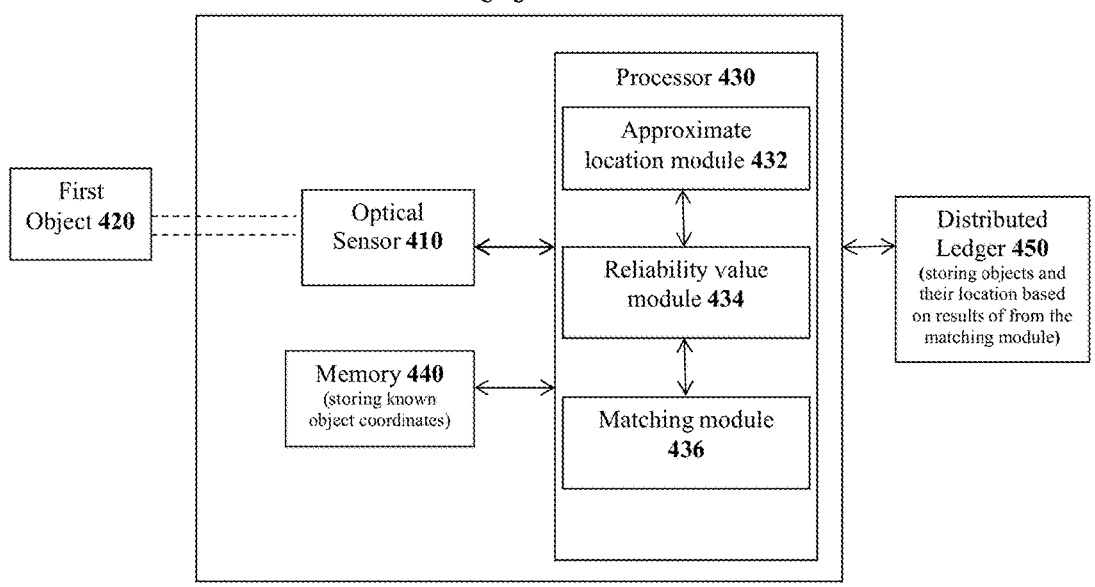
FIG. 4 shows an exemplary imaging device with basic components that can be used to support ARGPS functionality shows an exemplary system with basic components that can be used to support ARGPS functionality.

FIG. 4 illustrates an aspect of the present disclosure that relates to an imaging device 400 that determines its exact location. In an exemplary embodiment, the imaging device 400 can include an optical sensor 410 configured to detect a first object 420. The optical sensor 410 can convert light rays into electronic signals to detect the first object 420. The optical sensor 410 can measure a physical quantity of light and then translate it into a form that is readable by the imaging device 400.

The imaging device 400 can include a processor 430 with an approximate location module 432, a reliability value module 434, and a matching module 436. The approximate location module 432 can be configured to determine an approximate location of the first object 420. The reliability value module 434 can be configured to determine a reliability value of the approximate location based on at least one of a credential of the imaging device 400, a topology of a surface that is associated with the first object 420, or proximity between the imaging device 400 and the first object 420.

In an exemplary embodiment, the imaging device 400 can include a memory 440 configured to store a predefined location of a second object. The second object can be different or same as the first object 420. The matching module 436 can be configured to determine whether the predefined location of the second object matches the approximate location of the first object 420 within a pre-specified margin of error, wherein when there is a mismatch greater than the pre-specified margin of error, the processor is configured to store the first object 420 and its approximate location on a distributed ledger 450, and when there is a match within the pre-specified margin of error, the processor 430 is configured to determine the exact location of the imaging device 400 based on the predefined location stored in the memory.

Figure 5:
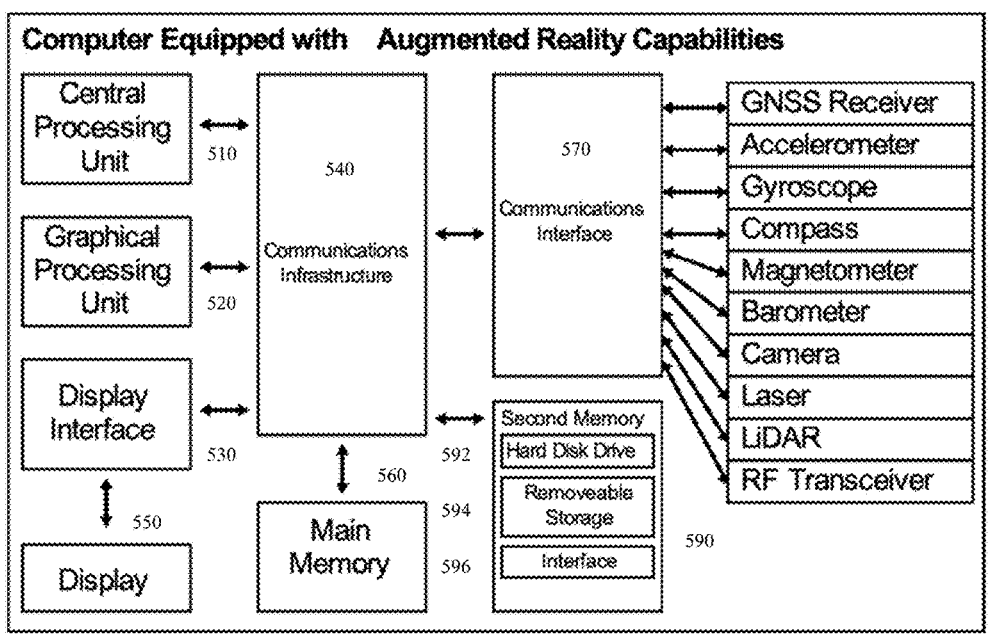
FIG. 5 shows an exemplary detailed view of an imaging device that can be used to support ARGPS functionality.

FIG. 5 shows an exemplary detailed view of a device that can be used to support ARGPS functionality. In an exemplary embodiment, this device can be a detailed version of the imaging device of FIG. 4. Any use of each of these components of FIG. 5 can be consistent with their application previously described in the present disclosure, and any equivalents thereof.

The device of FIG. 5 can include a central processing unit (CPU) 510, a graphical processing unit (GPU) 520, a display interface 530 that can interface with a communications infrastructure 540. In an exemplary embodiment, the display interface 530 can be a touch screen interface. In an exemplary embodiment, the communications infrastructure 540 can be used to connect to wireless communications, wired communications, or satellite communications, or any equivalents thereof.

The device of FIG. 5 can include a display 550 that can interface with the display interface 530, and memory 560 that can interface with the communications infrastructure 540. The communications infrastructure 540 can interface with a communications interface 570, which includes a GNSS receiver 571, an accelerometer 572, a gyroscope 573, a compass 574, a magnetometer 575, a barometer 576, a camera 577, a laser 578, a LiDAR 579, and a radio frequency (RF) transceiver 580. The communications infrastructure 540 can interface with a second memory 590, which includes a hard disk drive 592, removable storage 594, and interface 596.

Figure 6:
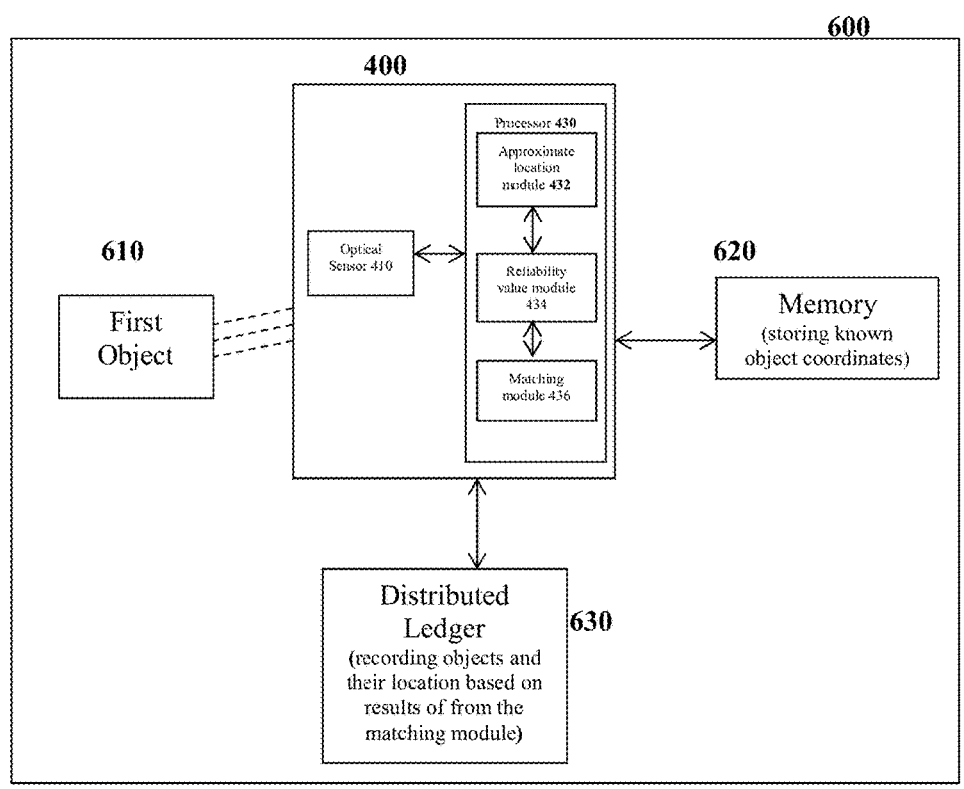
FIG. 6 shows an exemplary view of a system with an imaging device that can be used to support ARGPS functionality.

FIG. 6 illustrates an aspect of the present disclosure that relates to a system 600 for determining an exact location of an imaging device. In an exemplary embodiment, the system 600 can include the imaging device 400 configured to detect a first object 610, and determine an approximate location of the first object 610, and a reliability value of the approximate location based on at least one of a credential of the imaging device, a topology of a surface that is associated with the first object 610, or proximity between the imaging device 400 and the first object 610.

The system 600 can include a memory 620 configured to store a predefined location of a second object, wherein the imaging device 400 is configured to determine whether the predetermined location of the second object matches the approximate location of the first object 610 within a pre-specified margin of error.

The system 600 can include a distributed ledger 630 that can be configured to store the first object and its approximate location when there is a mismatch greater than the pre-specified margin of error, wherein when there is a match within the pre-specified margin of error, the imaging device determines its exact location based on the predefined location stored in the memory 620.

In an exemplary embodiment, the imaging device 400 of the system 600 can be configured to determine the topology of the surface associated with the first object based on at least one of a location of the imaging device, orientation of the imaging device, terrain of the first object's surface, proximity of the first object to the imaging device, curvature of the earth, or an optical property of the imaging device.

Figure 7:
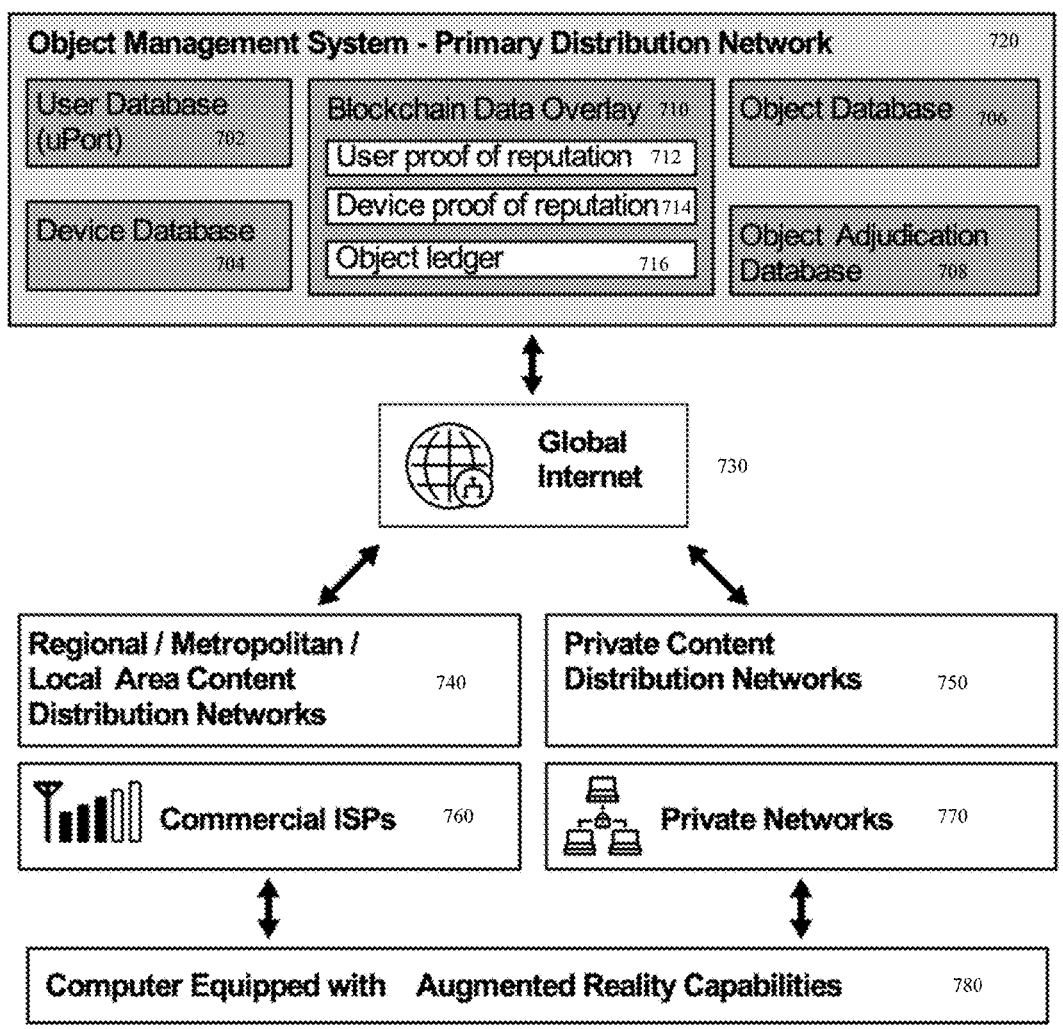
FIG. 7 shows an exemplary detailed system view of the physical components to present a notional representation of connectivity among the imaging device, networks, and external systems.

FIG. 7 shows an exemplary detailed view of a system that can be used to support ARGPS functionality. In an exemplary embodiment, this system can be a detailed version of the system of FIG. 6.

In an exemplary embodiment, the system 700 of FIG. 7 can include an object management system (OMS) 720 at a primary distribution network that can be connected to the Internet 730. The OMS 720 can include a user database 702 that can provide discrete, unique authentication to $3^{rd}$ party services while maintaining anonymity (e.g. uPort). The OMS 720 can include a device database 704 that can store any device related information such as the type of mobile devices (e.g. Apple, Google, Sony, and Samsung), or any hardware platforms equipped with the device (e.g. Apple's ARKit and Google (Android) ARCore). The OMS 720 can include an object database 706 that can store information related to known objects. The OMS 720 can include an object adjudication database 708 that can store adjudication information of new or existing objects as they are identified.

In an exemplary embodiment, the OMS 720 can include a Blockchain data overlay 710, which can include a user proof of reputation 712 that can be consensus model depending on a reputation of participating users. The Blockchain data overlay 710 can include a device proof of reputation 714 that can be consensus model depending on a reputation of participating imaging device, and an object ledger 716 that stores any object related information.

The OMS 720 can be connected, via the internet 730, to regional/metropolitan/local area content distribution networks 740, private content distribution networks 750, commercial ISPs 760, private networks 770, and so forth. The connection of the OMS 720 with one or more of the networks can depend on the application of the disclosed ARGPS as discussed in detail later in this disclosure.

Figure 8:
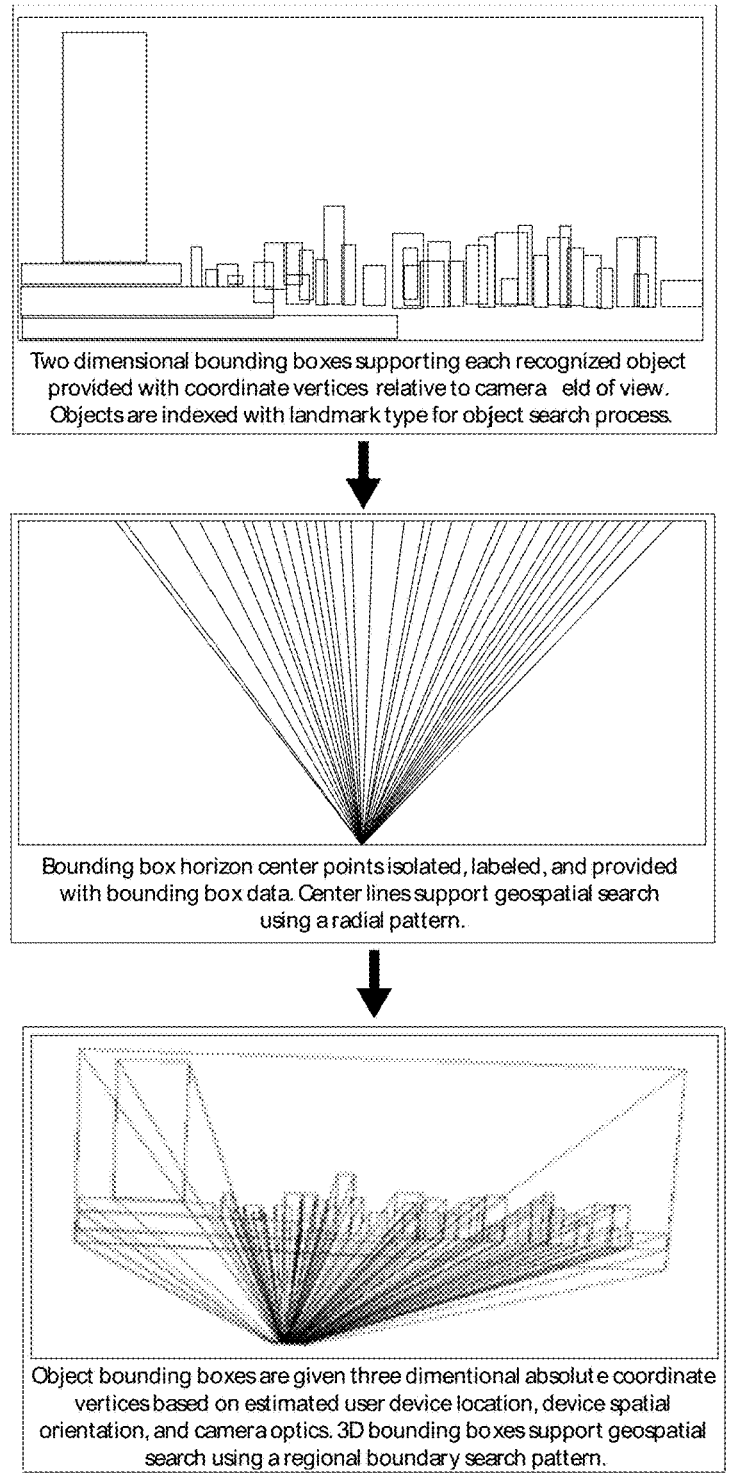
FIG. 8 is an exemplary diagram of the search process, showing how the computer's rough sense of its position, the density of identified objects, and the availability of objects in the database determines the search radius and the return of objects in to the computer's memory for the machine learning position determination activity.

FIG. 8 illustrates an exemplary diagram of a search process for an object, showing how the computer's rough sense of its position, the density of identified objects, and the availability of objects in the database determines the search radius and the return of objects in to the computer's memory for the machine learning position determination activity.

In an exemplary embodiment based on FIG. 8, two dimensional bounding boxes supporting each recognized object can be provided with coordinate vertices relative to camera field of view. Object can be indexed with landmark type for object search process. Furthermore, bounding box horizon center points can be isolated, labeled and provided with bounding box data. Center lines can support geospatial search using a radial pattern. Additionally, object bounding boxes can be given three-dimensional absolute coordinate vertices based on estimated user device location, spatial orientation, and camera optics. 3D bounding boxes can support geospatial search using a regional boundary search pattern.

Figure 9A:
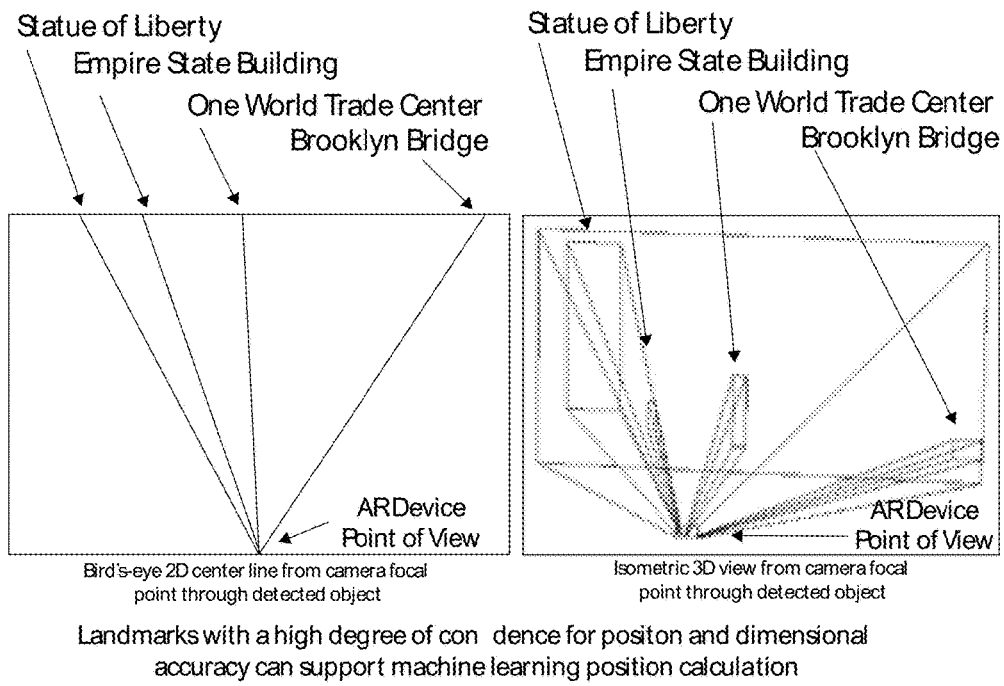
FIG. 9A is an exemplary rendering of the machine learning-based position determination from the object topology search results. Several identified structures of known heights allow a machine learning process to determine its exact whereabouts.

FIG. 9A illustrates an exemplary rendering of the machine learning-based position determination from the object topology search results in a bird's eye from a camera focal point through a detected object, and isometric 3D view from a camera focal point through a detected object. Several identified structures of known heights (e.g. Statue of Liberty, Empire State Building, One World Trade Center, Brooklyn Bridge) can allow a machine learning process to determine an imaging device's position. Landmarks with a high degree of confidence for position and dimensional accuracy can support machine learning position calculation.

Figure 9B:
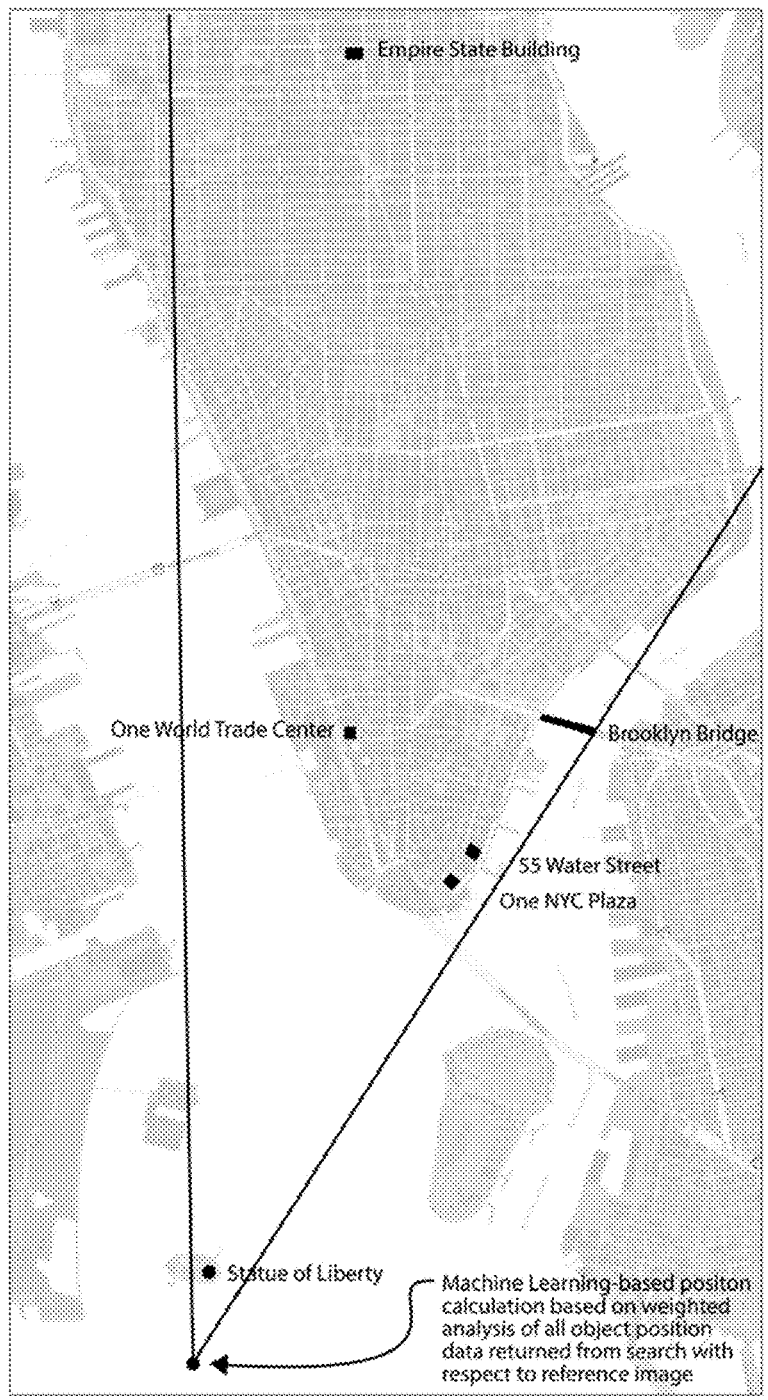
FIG. 9B is an exemplary rendering of the machine learning-based global position determination from the object topology search results. Several identified structures of known heights allow a machine learning process to determine its exact whereabouts.

FIG. 9B is an exemplary rendering of the machine learning-based global position determination from the object topology search results. Several identified structures of known heights (e.g. Statue of Liberty, Empire State Building, One World Trade Center, Brooklyn Bridge) stored in database can allow a machine learning process to determine an imaging device's position.

Figure 10:
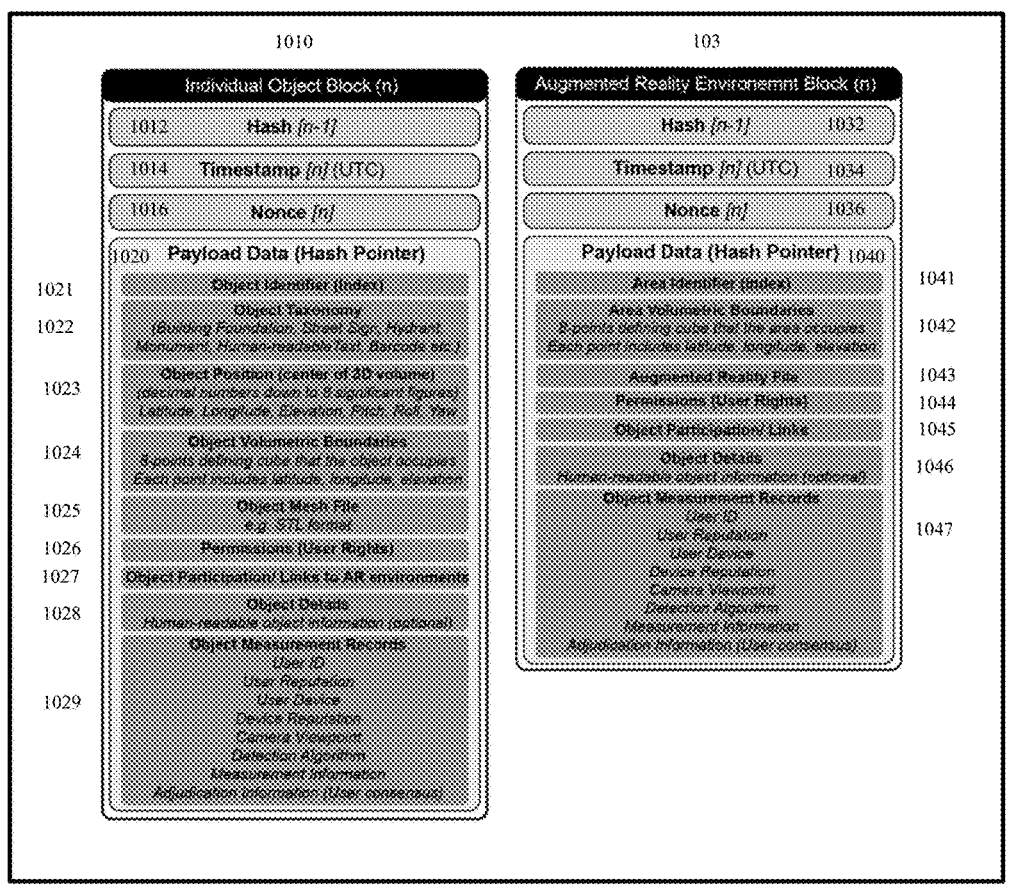
FIG. 10 is an exemplary diagram of the distributed ledger characteristics pointing to each respective object's pointer information and representative object three dimensional characteristics that allows users and devices to look up information and add new objects, respectively.

FIG. 10 is an exemplary rendering of the characteristics of a distributed ledger 1000, as used herein, that can point to each respective object's pointer information and representative object three dimensional characteristics that allows users and devices to look up information and add new objects.

FIG. 10 shows an exemplary block 1010 of the distributed ledger for an individual object. In an exemplary embodiment, the block 1010 can include hash information 1012, timestamp information 1014, nonce 1016, and payload data 1020.

In an exemplary embodiment, the payload data 1020 can include object identifier (e.g. an index) 1021 that can be used to uniquely identify an object, object taxonomy information 1022 that can be used to classify objects (e.g. building foundation, street sign, hydrant, monument, human-readable text, barcode, and equivalents thereof), objection position information 1023 that can be used to determine a position information of objects (e.g. latitude, longitude, elevation, pitch, roll, yaw, and equivalents thereof), object volumetric boundary information 1024 that can be used to define object boundaries (e.g. eight points defining cube that the object occupies, such that each point includes latitude, longitude, and elevation), object mesh file 1025 that can be used to define a shape of an object (e.g. STL format), user permission information 1026 that can be used to identify user access permissions, object participation information 1027, object details 1028 (e.g. human readable object information), and object measurement records 1029 that can identify a measurement history of an object (e.g. user Id, user reputation, user device, device reputation, camera viewpoint, detection algorithm, measurement information, adjudication information).

FIG. 10 shows an exemplary block 1030 of the distributed ledger for augmented reality environment. In an exemplary embodiment, the block 1030 can include hash information 1032, timestamp information 1034, nonce 1036, and payload data 1040.

In an exemplary embodiment, the payload data 1040 can include area identifier 1041 that can be used to uniquely identify an area (e.g. an index), area volumetric boundary information 1042 that can be used to that can be used to define area boundaries (e.g. eight points defining cube that the object occupies, such that each point includes latitude, longitude, and elevation), augmented reality file 1043 that can be used to describe the location and appearance of virtual objects in the scene, user permission information 1044 that can be used to identify user access permissions, object participation information 1045, object details 1046 that can be used to (e.g. human readable object information), and object measurement records 1047 that can identify a measurement history of an object (e.g. user Id, user reputation, user device, device reputation, camera viewpoint, detection algorithm, measurement information, adjudication information).

In an exemplary embodiment, the use of a distributed ledger (blockchain) 1000 as a primary database in the method to store objects and their locations can allow monitoring and recording all entered and edited objects. This architecture is beneficial because decentralization can allow parallel resources to scale the detection, capture, retention, post-processing, concurrence, and hosting of identified, static, physical objects. In other words, crowdsourcing the primary ledger will allow this data to exist in a robust and resilient manner. Additionally, a common ledger shared by a large contributor and user community can provide data immutability where users can trust the accuracy of the information provided to them and contributors can submit new data for careful, accurate, adjudication to improve the accuracy of the database. Another benefit of this architecture is that peer reviewed object consensus in an open environment can minimize false positives, malicious or erroneous entry, and increase accuracy of object measurement.

In an exemplary embodiment, a secondary database in the form of a distributed ledger 1000 can also be used in the method. The secondary database can allow the user community to contribute to the object database while retaining anonymity and while possessing proof-of-reputation to support weighting the value of each piece of contributed data. For example, a blockchain technology known as uPort allows discrete, unique authentication to $3^{rd}$ party services while maintaining anonymity. Database entries can be processed in a chronological order where each timestamped entry will be entered in the payload section of a block. The remainder of the block can include a nonce, a hash value that represents the checksum of the previous block, and a timestamp of the block added to the system.

The system can provide robust accuracy for position determination. The exact level of precision can be determined by the accuracy of the hardware sensors, the accuracy of the object's measurements with respect to its actual physical position, the existence of multiple physical objects used simultaneously to calculate position, and the device's distance from the observed object(s). In areas where GNSSs and A-GPS are unavailable, this system can determine accurate position information independent of satellite and terrestrial signals querying if an object database is available to the end user.

For commercial benefits, the system can enable devices to determine a coordinate position and spatial orientation down to a precision resolution (depending on the compilation of sensors used and their respective measurement precision). As a result, this capability can allow commercial devices to enhance current functional operations, replace precision instruments with smartphone devices, or reduce errors currently accepted for normal operation.

The present disclosure's methods, devices, and systems can be utilized in many industries and system integrations requiring precise determination of geospatial positions. These industries include, but not limited to, one or more of agriculture, autonomous navigation, construction and surveying, defense/military, public safety, commercial applications, industrial operations, disabled assist services, and geospatial contextual authentication for Enterprise Information Technology (IT) and Information Assurance (IA).

Agriculture may require precision position for farm management. These responsibilities may include observing, measuring, planting, harvesting, fertilizing, watering, and general crop maintenance in an effort to optimize crop return and minimize production resources. Agricultural equipment currently employs GNSS-based receivers to calculate crop asset positions and carry out farm management processes. Assets may include ground or airborne systems including drones to support these processes. Future systems that leverage the disclosed ARGPS can observe ground markers embedded within the farm environment to position ground or airborne assets in precision positions (greater than what GNSS receivers can provide).

Autonomous vehicles can leverage full motion video and LiDAR to provide precision position detection for navigation. With the incorporation of the disclosed ARGPS, video combined with spatial awareness sensors and the disclosed method could add precision position calculations to navigable paths, particularly in urban positions and mountainous terrain where tall objects impede GNSS signals from effective real-time position determination. Further, autonomous vehicles supporting routine activities in a localized area could leverage precision waypoints along sidewalks, in narrow alleyways, parking garages, tunnels, or within buildings, and can leverage ARGPS for precision guidance supporting autonomous navigation and robotics tasks (such as exact position for rider pickup).

Existing Civil Engineering technologies leverage a combination of specialized laser-based measurement tools for exact distance measurement and Differential GPS for terrestrial position-based measurement, which are all expensive to own and operate. A set of temporary static markers or newly formed construction objects can be used for a smartphone-operated construction measurement system to replace professional equipment—and with improved precision. Additional extensions could include property rights.

Military organizations require additional position and navigation capabilities in addition to GPS during times of GNSS degradation or outages. The disclosed system can be used as an independent way-finding tool to detect known landmarks, earth formations, and manmade objects to calculate a device's coordinates without satellite navigation.

The disclosed technology can be used for defending against Electronic Warfare by detecting long term manipulation of GNSS signals (e.g. GPS) and preventing land or airborne vessels from veering off course (water may be challenging if no static objects in sight). ARGPS system coupled with a precision timing interface, a system locked on stationary objects, can detect signal anomalies by showing clear GNSS signal manipulation over time.

Information Security systems may include contextual authentication as part of the Identity and Access Management (IdAM) domain. Geographic position (where a user is specifically located) is an identified contextual authentication parameter. Using AR-GPS, a mobile user can prove one's indoor or outdoor position by enabling the disclosed ARGPS on a mobile device and capturing unique physical objects while connecting with specific wireless networks and recognizing a user's face—all for authentication to an IT system.

Existing Public Safety forensic-based applications and processes involve photography and the obtainment of evidence with respect to a physical topology. The post-processing of this information requires significant manual labor. The disclosed ARGPS can be leveraged in step with existing photographic methods, for a greater precision of which could result in a faster path to determination of factual evidence while reducing opportunity for error or fraudulent findings.

With dramatic improvements of a mobile device able to detect its exact real-time position through the disclosed ARGPS, visually impaired users can leverage a mapping application to provide audible real-time guidance while traversing navigable walking environments. Further, an application of the disclosed ARGPS could provide awareness of morphological objects impeding the approaching path of navigation. With enough pre-existing static objects able to provide continuous coverage, a visually impaired person could use a smartphone-based mapping program to safely travel without the need for a walking companion or assist device.

The disclosed ARGPS can provide precision handheld 3D navigation within all indoor environments. This could be particularly useful for society to navigate within airports, shopping malls, garages, stadiums, and large office complexes. Shopping Assistance is also a closely related subset of this application in retail outlets where products are difficult to find.

Similar to autonomous navigation, ports of entry, ship yards, shipping/sorting facilities, logistics warehouses, manufacturing facilities, and other large-scale operations could benefit from precision navigation of automated transport or robotic systems provided by the disclosed ARGPS to rapidly process physical objects. To augment ARGPS in complex industrial environments, 3D barcodes could be used as static, private, markers.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A method of determining an exact location of an imaging device, the method comprising:
   detecting a first object and determining its approximate location based on an approximate location of the imaging device;
   determining a reliability value of the approximate location based on at least one of a credential of the imaging device, a topology of a surface that is associated with the first object, or proximity between the imaging device and the first object;
   receiving a predefined location of a second object from a memory; and
   determining whether the predetermined location of the second object matches, within a pre-specified margin of error, the approximate location of the first object, wherein
   when there is a mismatch greater than the pre-specified margin of error, storing the first object and its approximate location on a distributed ledger, and
   when there is a match within the pre-specified margin of error, determining the exact location of the imaging device based on the predefined location stored in the memory.

2. The method of claim 1, comprising:
   determining the approximate location of the imaging device using at least one of Global Navigation Satellite System (GNSS), Assistive-Global Positioning System (A-GPS), accelerometers, gyroscopes, magnetometers, compasses, barometers, radio frequency, Lidar, or laser measurement sensors;
   determining the approximate location of the first object by using the approximate location of the imaging device, and by estimating a distance between the first object and the imaging device;
   searching in a database of known objects for the second object and its predefined location; and
   storing the second object and its predefined location in the memory.

3. The method of claim 2, comprising:
   determining an extent of the searching in the database of known objects based on at least one of a precision of the approximate location of the imaging device, or a geographic area observed by the imaging device.

4. The method of claim 2, comprising:
   identifying the second object in the database of known objects by matching traits of the first object with the known objects, wherein the traits include at least one of a topology of an associated surface, recognizable features, or a location.

5. The method of claim 4, wherein the recognizable features include at least one of text, marks, or edge information.

6. The method of claim 1, comprising:
   determining the topology of the surface associated with the first object based on at least one of a location of the imaging device, orientation of the imaging device, terrain of the first object's surface, proximity of the first object to the imaging device, curvature of the earth, or an optical property of the imaging device.

7. The method of claim 1, comprising:
   determining the credential of the imaging device based on at least one of a reputation of a user operating the imaging device, a capability of the imaging device, or an accuracy of the imaging device.

8. The method of claim 1, comprising:
   identifying the first object as a stationary object when the first object has a rigid structural property and a geographic position that can be referenced to a specific planetary surface location for a particular duration; and
   ranking the first object based on at least one of the reliability value of the approximate location, or the particular duration.

9. The method of claim 8, comprising:
   storing the first object and its approximate location on the distributed ledger at least when the first object is ranked above a predefined rank, when the first object has a prequalified status, or when the first object and its location have been adjudicated by a number of users greater than a predefined value.

10. The method of claim 1, wherein the exact location of the imaging device is an exact global position of the imaging device.

11. The method of claim 1, comprising:
    identifying types of stationary objects in a field of view of the imaging device using real-time object detection; and
    determining a relative birds-eye topology of each of the stationary objects based on the spatial orientation and an absolute position of the imaging device.

12. An imaging device that determines its exact location, the imaging device comprising:
    an optical sensor configured to detect a first object;
    a memory configured to store a predefined location of a second object; and
    a processor including:
      an approximate location module configured to determine an approximate location of the first object,
      a reliability value module configured to determine a reliability value of the approximate location based on at least one of a credential of the imaging device, a topology of a surface that is associated with the first object, or proximity between the imaging device and the first object, and
      a matching module configured to determine whether the predefined location of the second object matches the approximate location of the first object within a pre-specified margin of error, wherein when there is a mismatch greater than the pre-specified margin of error, the processor is configured to store the first object and its approximate location on a distributed ledger, and when there is a match within the pre-specified margin of error, the processor is configured to determine the exact location of the imaging device based on the predefined location stored in the memory.

13. A system for determining an exact location of an imaging device, the system comprising:
    an imaging device configured to detect a first object, and determine an approximate location of the first object, and a reliability value of the approximate location based on at least one of a credential of the imaging device, a topology of a surface that is associated with the first object, or proximity between the imaging device and the first object;
    a memory configured to store a predefined location of a second object, wherein the imaging device is configured to determine whether the predetermined location of the second object matches the approximate location of the first object within a pre-specified margin of error; and
    a distributed ledger that stores the first object and its approximate location when there is a mismatch greater than the pre-specified margin of error, wherein when there is a match within the pre-specified margin of error, the imaging device determines its exact location based on the predefined location stored in the memory.

14. The system of claim 13, wherein the imaging device is configured to determine the topology of the surface associated with the first object based on at least one of a location of the imaging device, orientation of the imaging device, terrain of the first object's surface, proximity of the first object to the imaging device, curvature of the earth, or an optical property of the imaging device.

* * * * *

UNITED STATES PATENT AND TRADEMARK OFFICE
CERTIFICATE OF CORRECTION

PATENT NO.         : 10,262,437 B1
APPLICATION NO.    : 16/176673
DATED              : April 16, 2019
INVENTOR(S)        : James J. Ter Beest, III It is certified that error appears in the above-identified patent and that said Letters Patent is hereby corrected as shown below:

At (72) Inventor after "James J. Ter Beest III, McLean, VA (US)" add:
--Evan Montgomery-Recht, McLean, VA (US)--

Signed and Sealed this
Eighteenth Day of February, 2020

Andrei Iancu
*Director of the United States Patent and Trademark Office*